United States Patent
Seo et al.

(10) Patent No.: US 9,538,516 B2
(45) Date of Patent: Jan. 3, 2017

(54) METHOD AND DEVICE FOR RECEIVING DATA IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 14/369,592

(22) PCT Filed: Dec. 27, 2012

(86) PCT No.: PCT/KR2012/011602
§ 371 (c)(1),
(2) Date: Jun. 27, 2014

(87) PCT Pub. No.: WO2013/100645
PCT Pub. Date: Jul. 4, 2013

(65) Prior Publication Data
US 2015/0003352 A1    Jan. 1, 2015

Related U.S. Application Data

(60) Provisional application No. 61/580,643, filed on Dec. 27, 2011.

(51) Int. Cl.
*H04W 4/00* (2009.01)
*H04W 72/04* (2009.01)
(Continued)

(52) U.S. Cl.
CPC ............. *H04W 72/042* (2013.01); *H04B 7/08* (2013.01); *H04B 7/068* (2013.01); *H04L 5/0053* (2013.01); *H04L 5/0094* (2013.01)

(58) Field of Classification Search
CPC .. H04W 72/042; H04W 72/04; H04W 72/046; H04B 7/08; H04B 7/068; H04L 27/261; H04L 27/2613; H04L 5/0053; H04L 1/0045; H04L 5/0094
See application file for complete search history.

(56) References Cited

U.S. PATENT DOCUMENTS 8,009,606 B2 *   8/2011   Seo ................... H04W 72/042
                                                      370/319
8,520,619 B2 *   8/2013   Hong ................... H04L 5/0053
                                                      370/329
(Continued)

FOREIGN PATENT DOCUMENTS

KR    10-2011-0112750 A    10/2011

OTHER PUBLICATIONS

LG Electronics, "Search space design for enhanced PDCCH", 3GPP TSG RAN WG1 Meeting #67, R1-113917, San Francisco, California, USA, Nov. 14-18, 2011, 3 pages.
(Continued)

*Primary Examiner* — Brian O'Connor
(74) *Attorney, Agent, or Firm* — Birch, Stewart, Kolasch & Birch, LLP

(57) ABSTRACT

A method is provided for allowing a user equipment to receive data in a wireless communication system. The user equipment performs blind decoding for an enhanced physical downlink channel (EPDCCH) in which a downlink control information (DCI) is transmitted. The user equipment decodes data on a physical downlink shared channel (PDSCH) by using the DCI. If the DCI does not comprise demodulation reference signal information for decoding of the PDSCH, the PDSCH is decoded by using demodulation reference signal information associated with a resource
(Continued)

(a)

(b)

block among a plurality of resource blocks in which the DCI is transmitted.

12 Claims, 13 Drawing Sheets

(51) Int. Cl.
*H04B 7/08* (2006.01)
*H04L 5/00* (2006.01)
*H04B 7/06* (2006.01)

(56) References Cited

U.S. PATENT DOCUMENTS

| | | | | |
|---|---|---|---|---|
| 8,724,488 | B2 * | 5/2014 | Shin | H04W 52/32 370/252 |
| 8,780,841 | B2 * | 7/2014 | Earnshaw | H04L 5/001 370/207 |
| 8,891,452 | B2 * | 11/2014 | Nishio | H04L 5/0007 370/252 |
| 9,008,048 | B2 * | 4/2015 | Liu | H04L 1/1819 370/329 |
| 9,144,070 | B2 * | 9/2015 | Yang | H04L 5/0007 |
| 9,252,918 | B2 * | 2/2016 | Nory | H04L 1/0045 |
| 2011/0249633 | A1 | 10/2011 | Hong et al. | |
| 2013/0003604 | A1 * | 1/2013 | Blankenship | H04L 5/0053 370/255 |
| 2013/0003663 | A1 * | 1/2013 | Blankenship | H04L 5/0053 370/329 |
| 2013/0044664 | A1 * | 2/2013 | Nory | H04L 1/0045 370/311 |
| 2013/0044727 | A1 * | 2/2013 | Nory | H04L 5/0092 370/330 |
| 2013/0121274 | A1 * | 5/2013 | Chen | H04L 5/0053 370/329 |
| 2015/0296542 | A1 * | 10/2015 | Heo | H04W 74/0833 370/329 |

OTHER PUBLICATIONS

LG Electronics, "UE Behaviors according to Search Space Configuration", 3GPP TSG RAN WG1 Meeting #67, R1-113993, San Francisco, California, US, Nov. 14-18, 2011, pp. 1-2.

Qualcomm Incorporated, "Search space design for e-PDCCH", 3GPP TSG RAN WG1 #67, R1-114125, San Francisco, California, USA, Nov. 14-18, 2011, 3 pages.

Renesas Mobile Europe Ltd., "On control signaling enhancements", 3GPP TSG-RAN WG1 Meeting #66, R1-112315, Athens, Greece, Aug. 22-26, 2011, 6 pages.

\* cited by examiner

FIG. 6
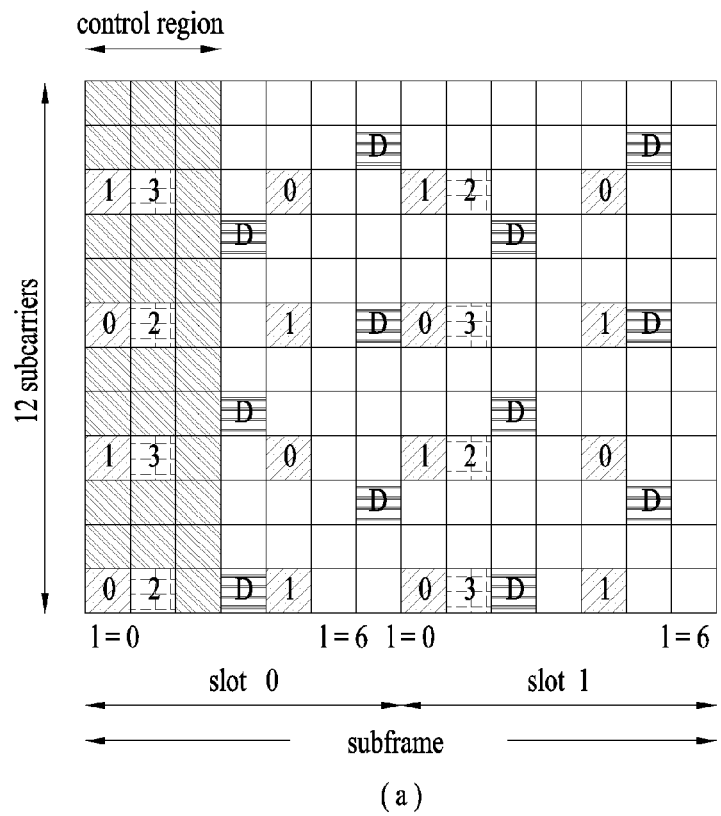
(a)
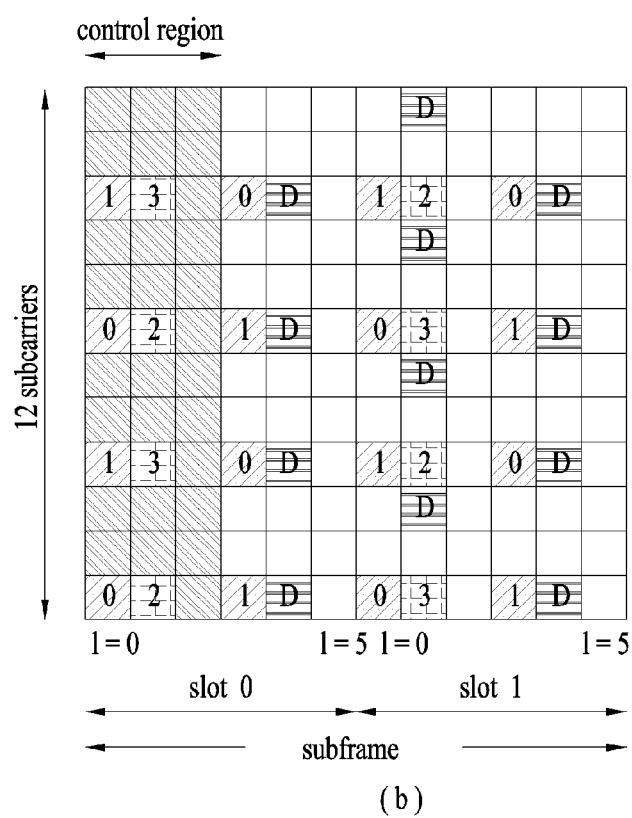
(b)

METHOD AND DEVICE FOR RECEIVING DATA IN WIRELESS COMMUNICATION SYSTEM

CROSS REFERENCE TO RELATED APPLICATIONS

This application is the National Phase of PCT International Application No. PCT/KR2012/011602, filed on Dec. 27, 2012, which claims priority under 35 U.S.C. 119(e) to U.S. Provisional Application No. 61/580,643, filed on Dec. 27, 2011, all of which are hereby expressly incorporated by reference into the present application.

TECHNICAL FIELD

The present invention relates to a wireless communication system, and more particularly, to a method and device for receiving data in case of enhanced physical downlink channel (EPDCCH) transmission.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE

Technical Problem

An object of the present invention devised to solve the conventional problem is to provide definition of DMRS information/configuration to be used during decoding of a physical downlink shared channel (PDSCH) in a fallback mode in case of EPDCCH transmission.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In the first technical aspect of the present invention, a method for allowing a user equipment to receive data in a wireless communication system comprises the steps of performing blind decoding for an enhanced physical downlink channel (EPDCCH) in which a plurality of kinds of downlink control information (DCI) are transmitted; and decoding data of a physical downlink shared channel by using downlink allocation DCI among the decoded DCI, wherein, if the downlink allocation DCI corresponds to fallback mode DCI, demodulation reference signal information for decoding of the EPDCCH, to which the downlink allocation DCI except for the fallback mode DCI is transmitted, is used for data decoding of the physical downlink shared channel.

In the second technical aspect of the present invention, a user equipment in a wireless communication system comprises a reception module; and a processor, wherein the processor performs blind decoding for an enhanced physical downlink channel (EPDCCH) in which a plurality of kinds of downlink control information (DCI) are transmitted, and decodes data of a physical downlink shared channel by using downlink allocation DCI among the decoded DCI, wherein, if the downlink allocation DCI corresponds to fallback mode DCI, demodulation reference signal information for decoding of the EPDCCH, to which the downlink allocation DCI except for the fallback mode DCI is transmitted, is used for data decoding of the physical downlink shared channel.

The first and second technical aspects of the present invention may include the following matters.

If the downlink allocation DCI is transmitted on two or more physical resource block pairs, the demodulation reference signal information for decoding of the EPDCCH may be associated with a physical resource block pair having the lowest antenna port index among the two or more physical resource block pairs.

If the downlink allocation DCI may be transmitted to one physical resource block pair, the demodulation reference signal information for decoding of the EPDCCH is one antenna port selected from a plurality of antenna ports allocated to the one physical resource block pair.

The plurality of DCI may include one or more uplink grant DCI and one or more downlink allocation DCI.

The demodulation reference signal information may include at least one of information related to antenna port and information related to scrambling sequence.

The antenna port may be one selected from a plurality of antenna ports allocated to each of one or more physical resource block pairs for the EPDCCH.

The fallback mode DCI may be a DCI format 1A.

Advantageous Effects

According to the present invention, ambiguity of DMRS information/configuration to be used during PDSCH decoding in a fallback mode of an EPDCCH may be solved.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a reference signal;

BEST MODE FOR CARRYING OUT THE INVENTION

Figure 1:
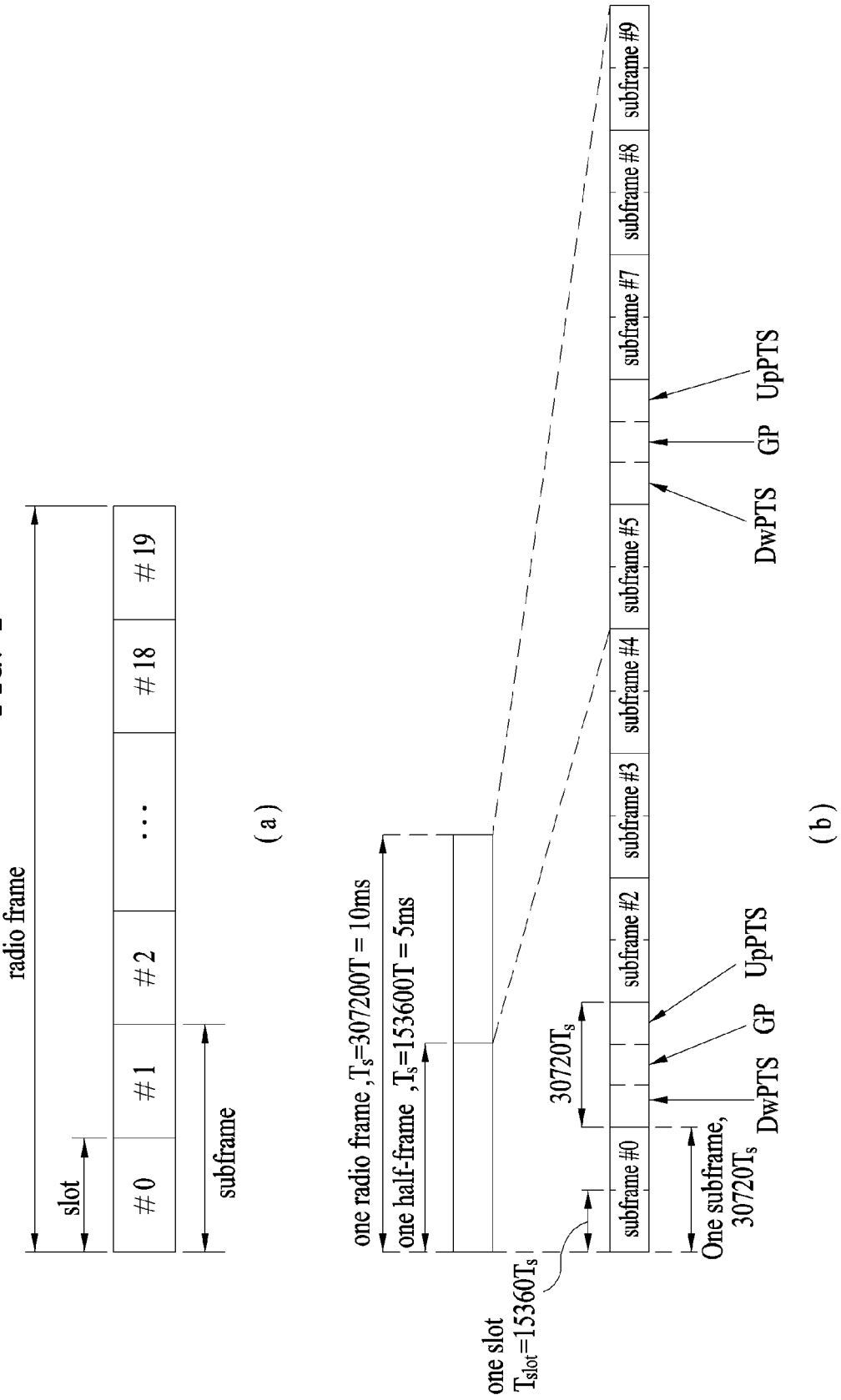
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station and a user equipment. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, terminal may be replaced with terminologies such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. For clarification of the description, although the present invention will be described based on the 3GPP LTE/LTE-A, it is to be understood that technical spirits of the present invention are not limited to the 3GPP LTE/LTE-A.

FIG. 1 is a diagram illustrating a structure of a radio frame.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(*a*) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
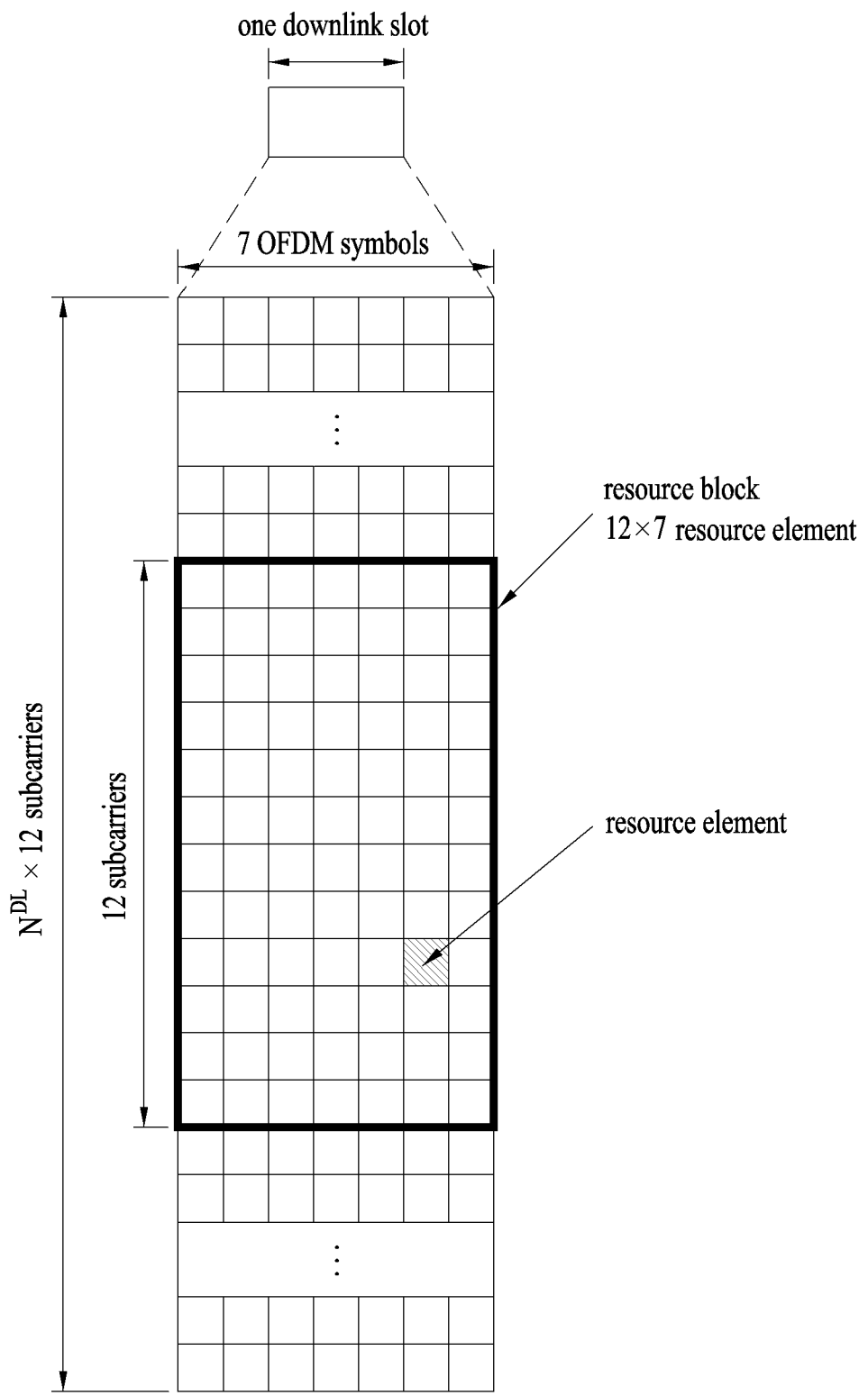
FIG. 2 is a diagram illustrating a resource grid of a downlink slot.

FIG. 2 is a diagram illustrating a resource grid at a downlink slot. One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number $N^{DL}$ of resource blocks (RBs) included in the downlink slot depends on a downlink transmission bandwidth. A structure of an uplink slot may be the same as that of the downlink slot.

Figure 3:
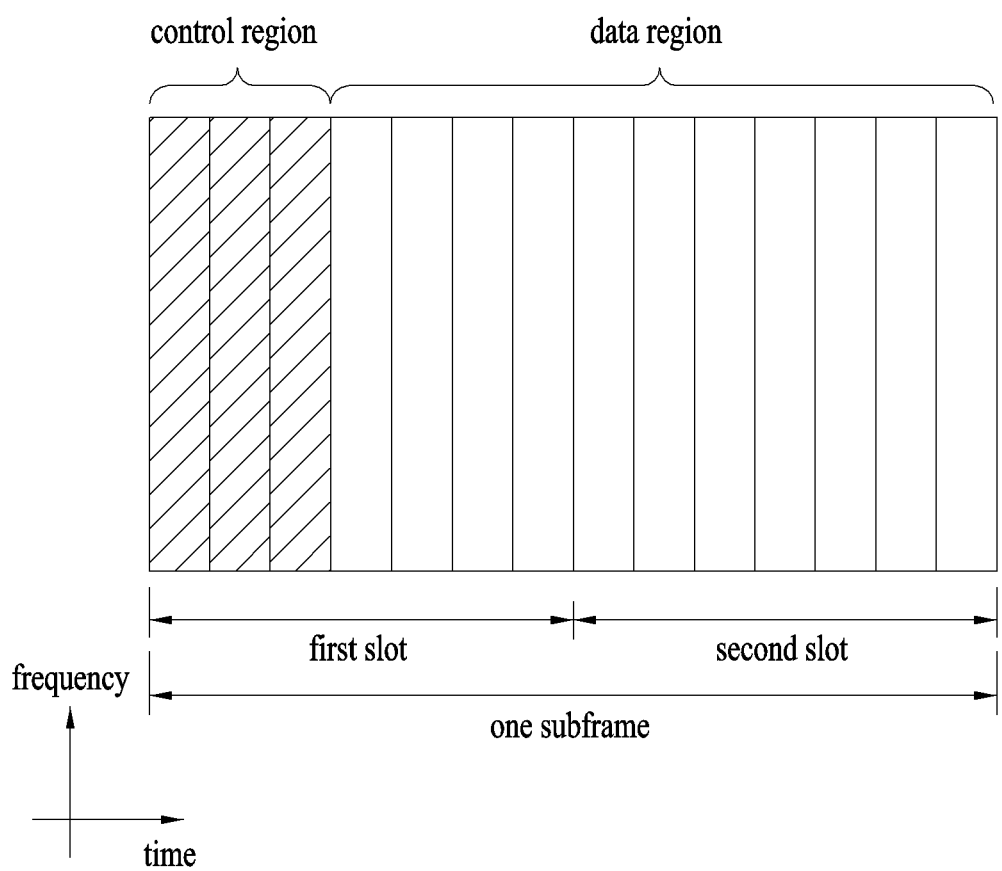
FIG. 3 is a diagram illustrating a structure of a downlink subframe.

FIG. 3 is a diagram illustrating a structure of a downlink subframe. Maximum three OFDM symbols located at the front of the first slot within the subframe correspond to a control region to which a control channel is allocated. The other OFDM symbols correspond to a data region to which a physical downlink shared channel (PDSCH) is allocated. Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group.

The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control command of an individual user equipment within a random user equipment group, transmission power control information, and activation of voice over Internet protocol (VoIP). A plurality of PDCCHs may be transmitted within the control region. The user equipment may monitor the plurality of PDCCHs. The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
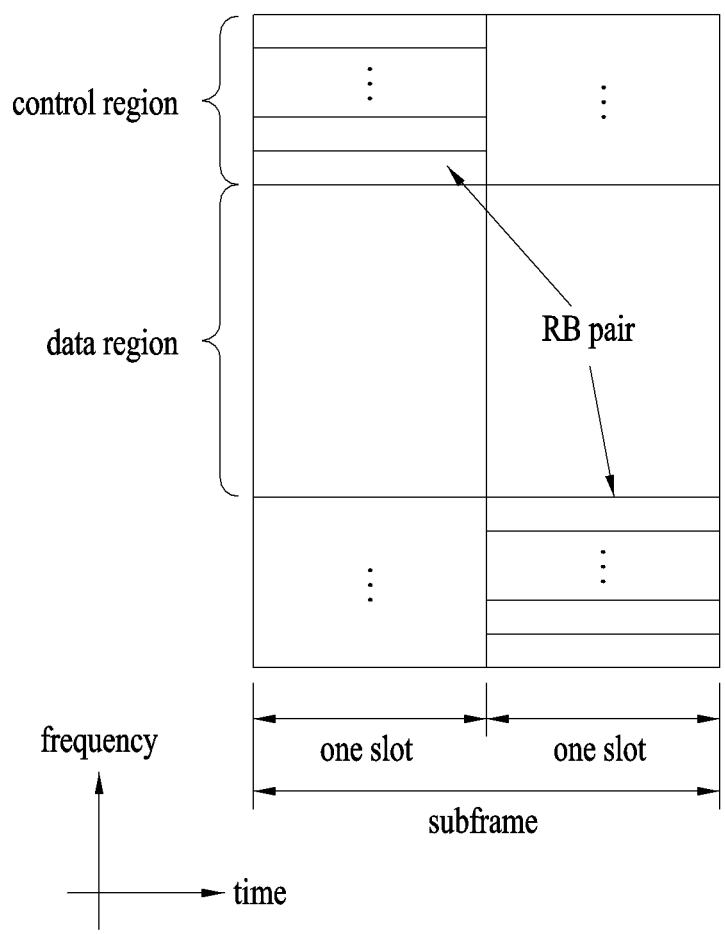
FIG. 4 is a diagram illustrating a structure of an uplink subframe.

FIG. 4 is a diagram illustrating a structure of an uplink subframe. The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

DCI Format

According to the current LTE-A (release 10), DCI formats 0, 1, 1A, 1B, 1C, 1D, 2, 2A, 2B, 2C, 3, 3A and 4 are defined. In this case, the DCI formats 0, 1A, 3 and 3A are defined to have the same message size as one another to reduce the number of blind decoding times, wherein blind decoding will be described later. These DCI formats may be divided into i) DCI formats 0 and 4 used for uplink grant, ii) DCI formats 1, 1A, 1B, 1C, 1D, 2, 2A, 2B and 2C used for downlink scheduling allocation, and iii) DCI formats 3 and 3A used for power control command depending on usage of control information to be transmitted.

The DCI format 0 used for uplink grant may include carrier offset (carrier indicator) required in respect of carrier aggregation, which will be described later, offset (flag for format 0/format 1A differentiation) used to identify the DCI format 0 from the DCI format 1A, a frequency hopping flag notifying whether frequency hopping is used for uplink PUSCH transmission, information on resource block assignment to be used for PUSCH transmission by the user equipment, a modulation and coding scheme, a new data indicator used to empty a buffer to perform initial transmission in respect of HARQ process, a transmission power control (TPC) command for scheduled for PUSCH, cyclic shift for demodulation reference signal (DMRS) and OCC index, uplink (UL) index required for TDD operation, and request of channel quality information (CQI). Meanwhile, since synchronous HARQ is used for the DCI format 0, the DCI format 0 does not include redundancy version unlike the DCI formats related to downlink scheduling allocation. The carrier indicator is not included in the DCI format if cross carrier scheduling is not used.

The DCI format 4 is newly added in the LTE-A release 10, and is to support application of spatial multiplexing to uplink transmission in the LTE-A. Since the DCI format 4 further includes information for spatial multiplexing as compared with the DCI format 0, the DCI format 4 has a greater message size, and further includes additional control information in addition to the control information included in the DCI format 0. In other words, the DCI format 4 further includes a modulation and coding scheme for a second transport block, precoding information for multi-antenna transmission, and sounding reference signal (SRS) request information. Meanwhile, since the DCI format 4 has a size greater than that of the DCI format 0, the DCI format 4 does not include offset for identifying the DCI format 0 from the DCI format 1A.

The DCI formats 1, 1A, 1B, 1C, 1D, 2, 2A, 2B and 2C used for downlink scheduling allocation may be divided into the DCI formats 1, 1A, 1B, 1C and 1D, which do not support spatial multiplexing, and the DCI formats 2, 2A, 2B and 2C, which support spatial multiplexing.

The DCI format 1C supports frequency continuous allocation only as compact downlink allocation, and does not include carrier offset and redundancy version as compared with the other formats.

The DCI format 1A is the format for downlink scheduling and random access process. The DCI format 1A may include carrier offset, an indicator indicating whether downlink distributive transmission is used, PDSCH resource allocation information, a modulation and coding scheme, redundancy version, HARQ process number for indicating a processor used for soft combining, new data offset used to empty a buffer for initial transmission in respect of HARQ process, a transmission power control command for PUCCH, and an uplink index required for TDD operation.

Control information of the DCI format 1 is mostly similar to that of the DCI format 1A. However, the DCI format 1A is related to continuous resource allocation, whereas the DCI format 1 supports discontinuous resource allocation. Accordingly, since the DCI format 1 further includes a resource allocation header, control signaling overhead is increased as trade-off of increase of flexibility in resource allocation.

As compared with the DCI format 1, the DCI formats 1B and 1D are common for each other in that the DCI formats 1B and 1D further include precoding information. The DCI format 1B includes PMI confirmation information, and the DCI format 1D includes downlink power offset information. The other control information included in the DCI formats 1B and 1D mostly corresponds to that of the DCI format 1A.

The DCI formats 2, 2A, 2B and 2C basically include most of the control information included in the DCI format 1A, and further includes information for spatial multiplexing. In this case, the information for spatial multiplexing include a modulation and coding scheme related to the second transport block, new data offset, and redundancy version.

The DCI format 2 supports closed-loop spatial multiplexing, the DCI format 2A supports open-loop spatial multiplexing. Both the DCI formats 2 and 2A include precoding information. The DCI format 2B supports dual layer spatial multiplexing combined with beamforming, and further includes cyclic shift information for DMRS. The DCI format 2C may be understood as extension of the DCI format 2B, and supports spatial multiplexing to reach eight layers.

The DCI formats 3 and 3A may be used to complement transmission power control information included in the aforementioned DCI formats for uplink grant and downlink scheduling allocation, that is, support semi-persistent scheduling. A command of 1 bit per user equipment is used in case of the DCI format 3, and a command of 2 bits per user equipment is used in case of the DCI format 3A.

Any one of the aforementioned DCI formats is transmitted through one PDCCH, and a plurality of PDCCHs may be transmitted within the control region. The user equipment may monitor the plurality of PDCCHs.

PDCCH Processing

A control channel element (CCE) which is a logic allocation unit is used when the PDCCH is mapped into REs. One CCE includes a plurality of resource element groups (REGs) (for example, nine REGs), each of which includes four neighboring REs excluding a reference signal (RS).

The number of CCEs required for a specific PDCCH is varied depending on DCI payload which is a size of control information, a cell bandwidth, a channel coding rate, etc. In more detail, the number of CCEs for a specific PDCCH may be defined in accordance with a PDCCH format as illustrated in Table 1 below.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Any one of four formats may be used for the PDCCH as described above, and is not notified to the user equipment. Accordingly, the user equipment should perform decoding without knowing the PDCCH format. In this case, decoding will be referred to as blind decoding. However, if the user equipment performs decoding of all the CCEs used for the downlink for each PDCCH format, it may cause great load. Accordingly, a search space is defined considering restriction of a scheduler and the number of decoding try times.

In other words, the search space is a set of candidate PDCCHs comprised of CCEs that should be decoded by the user equipment on an aggregation level. In this case, the aggregation level and the number of PDCCH candidates may be defined as illustrated in Table 2 below.

TABLE 2

| | Search space | | The number of |
| | Aggregation level | Size (CCE unit) | PDCCH candidates |
|---|---|---|---|
| User equipment-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As will be aware of it from Table 2 above, since four aggregation levels exist, the user equipment has a plurality of search spaces in accordance with each aggregation level. Also, as illustrated in Table 2, the search space may be divided into a user equipment specific search space and a common search space. The user equipment specific search space is intended for specific user equipments, each of which may acquire control information if RNTI and CRC masked in the PDCCH are valid by monitoring (trying decoding for a set of the PDCCH candidates in accordance with an available DCI format) the user equipment specific search space and checking the RNTI and the CRC.

The common search space is intended for dynamic scheduling for system information or paging message, and is used if a plurality of user equipments or all the user equipments should receive the PDCCH. However, the common search space may be used for a specific user equipment in view of resource management. Also, the common search space may be overlapped with the user equipment specific search space.

The search space may be determined specifically by the following Equation 1.

$$L\{(Y_k+m')\bmod \lfloor N_{CCE,k}/L\rfloor\}+i \qquad \text{[Equation 1]}$$

In this case, L is an aggregation level, $Y_k$ is a factor determined by RNTI and subframe number k, m' is the number of PDCCH candidates, is equal to $m+M^{(L)} \cdot n_{CI}$ if carrier aggregation is used and is equal to m (m'=m (m=0, ..., $M^{(L)}-1$)) if not so, $M^{(L)}$ is the number of PDCCH candidates, $N_{CCE,k}$ is a total number of CCEs of a control region at the kth subframe, and i is a factor that designates an individual CCE from each PDCCH candidate of the PDCCH (i=0, ..., L−1). In case of the common search space, $Y_k$ is always determined as 0.

Figure 5:
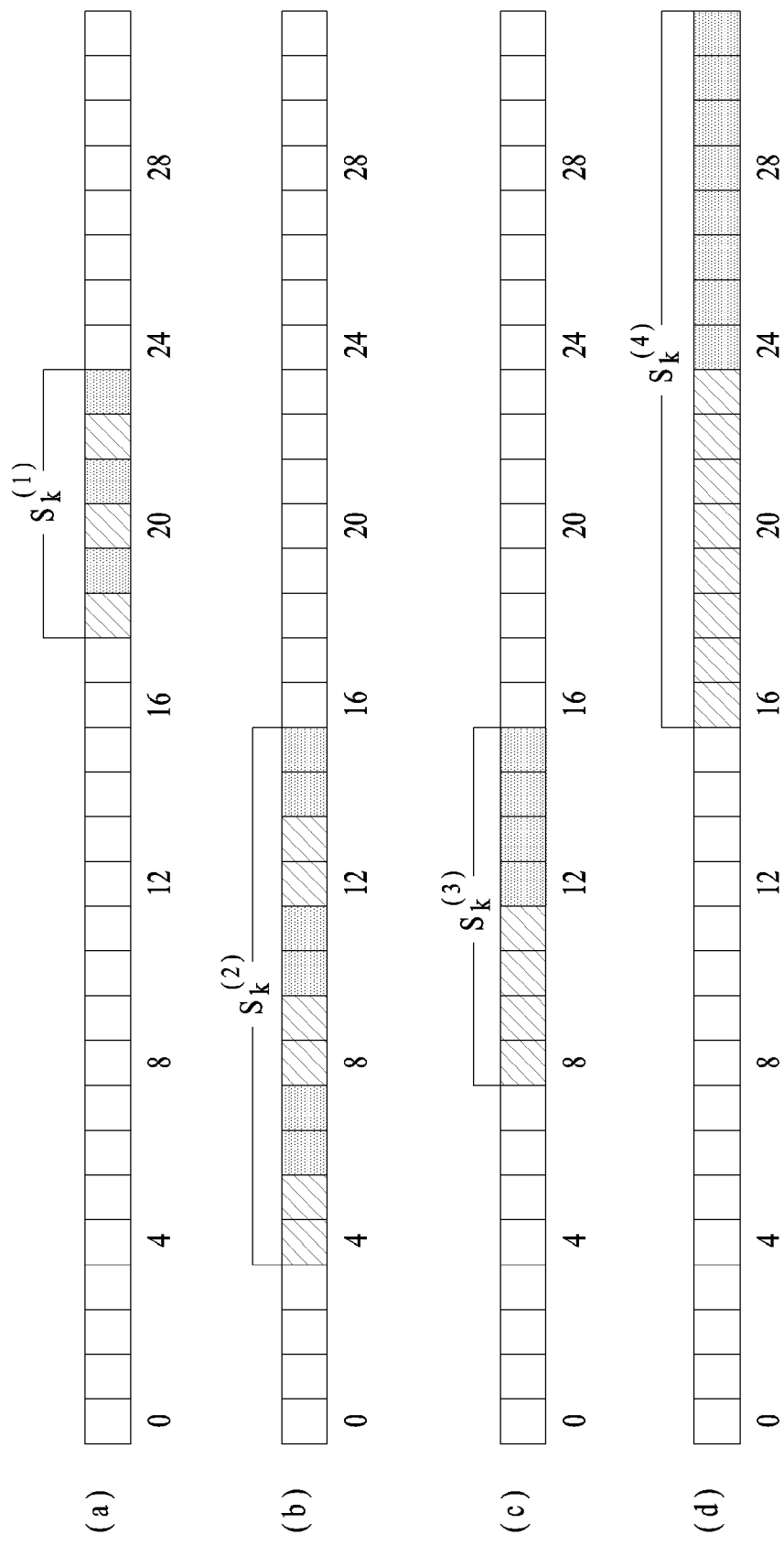
FIG. 5 is a diagram illustrating a search space.

FIG. 5 illustrates a user equipment specific search space (shaded portion) at each aggregation level that may be defined in accordance with the above Equation 1. In this case, carrier aggregation is not used, and the number of $N_{CCE,k}$ is 32 for convenience of description.

(a), (b), (c) and (d) of FIG. 5 respectively illustrate aggregation levels of 1, 2, 4 and 8, wherein numbers represent CCE numbers. In FIG. 5, a start CCE of the search space at each aggregation level is determined by RNTI and subframe number k as described above, and may be determined differently for each aggregation level due to a modulo function and L within the same subframe for one user equipment and is determined as a multiple only of the aggregation level due to L. In this case, $Y_k$ is exemplarily assumed as CCE number 18. The user equipment sequentially tries decoding for CCEs determined in accordance with the corresponding aggregation level by starting from the start CCE. For example, in (b) of FIG. 5, the user equipment tries decoding for the CCEs in a unit of two CCEs in accordance with the aggregation level by starting from the CCE number 4 which is the start CCE.

As described above, the user equipment tries decoding for the search space, wherein the number of decoding try times is determined by a transmission mode which is determined through the DCI format and RRC signaling. If carrier aggregation is not used, since the user equipment should consider two types of DCI sizes (DCI format 0/1A/3/3A and DCI format 1C) for each of six PDCCH candidates in case of the common search space, the number of decoding try times corresponding to maximum 12 times will be required. In case of the user equipment specific search space, since the user equipment considers two types of DCI sizes for the number of PDCCH candidates (6+6+2+2=16), the number of decoding try times corresponding to maximum 32 times will be required. Accordingly, if carrier aggregation is not used, the number of decoding try times corresponding to maximum 44 times will be required.

Meanwhile, if carrier aggregation is used, since decoding for the user equipment specific search space and the DCI format 4 is additionally performed as much as the number of downlink resources (component carriers), the maximum number of decoding times will be more increased.

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:

i) a demodulation reference signal (DM-RS) for channel estimation for coherent demodulation of information transmitted through the PUSCH and the PUCCH; and ii) a sounding reference signal (SRS) for allowing a base station to measure uplink channel quality at frequencies of different networks.

Meanwhile, the downlink reference signal may include:

i) a cell-specific reference signal (CRS) shared among all the user equipments within the cell;

ii) a user equipment (UE)-specific reference signal for a specific user equipment only;

iii) a demodulation reference signal (DM-RS) for coherent demodulation if the PDSCH is transmitted;

iv) channel state information-reference signal (CSI-RS) for transferring channel state information (CSI) if a downlink DMRS is transmitted;

v) a multimedia broadcast single frequency network (MBSFN) reference signal transmitted for coherent demodulation for a signal transmitted in an MBSFN mode; and v) a positioning reference signal used to estimate geographic position information of the user equipment.

The reference signal may be divided into two types in accordance with its purpose. Namely, examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received even by a user equipment that does not receive downlink data for a specific subframe. Also, this reference signal for acquisition of channel information may be used even in case of handover status. The latter reference signal is transmitted from the base station together with a corresponding resource when the base station transmits downlink data. In this case, the user equipment may perform channel measurement by receiving the corresponding reference signal, whereby the user equipment may demodulate the data. This reference signal for data demodulation should be transmitted to a region to which data are transmitted.

The CRS is used for both acquisition of channel information and data demodulation. The user equipment-specific reference signal is used for data demodulation only. The CRS is transmitted per subframe through a wideband. The reference signal for maximum four antenna ports is transmitted depending on the number of transmitting antennas of the base station.

For example, if the number of transmitting antennas of the base station is two, the CRS for the antenna ports 0 and 1 are transmitted. If the number of transmitting antennas is four, the CRS for the antenna ports 0 to 3 are respectively transmitted.

FIG. 6 is a diagram illustrating that CRS and DRS defined in the existing 3GPP LTE system (for example, release-8) are mapped onto a pair of downlink resource blocks (RBs). A pair of downlink resource blocks (RBs) may be expressed by one subframe on a time domain×twelve subcarriers on a frequency domain as a mapping unit of the reference signal.

In other words, a pair of resource blocks on a time axis have a length of 14 OFDM symbols in case of normal cyclic prefix (CP) (FIG. 6(a)) and has a length of 12 OFDM symbols in case of extended cyclic prefix (CP) (FIG. 6(b)).

FIG. 6 illustrates a position of a reference signal on a pair of resource blocks in a system that a base station supports four transmitting antennas. In FIG. 6, resource elements (REs) marked with '0', '1', '2' and '3' represent position of the CRS for each of antenna ports '0', '1', '2' and '3'. Meanwhile, resource elements marked with 'D' represent the position of the DMRS.

Demodulation Reference Signal (DMRS)

The DMRS is the reference signal defined for channel estimation for the PDCSCH through the user equipment. The DMRS may be used in transmission modes 7, 8 and 9. Although the DMRS had been initially defined for single layer transmission of an antenna port 5, the DMRS has been enlarged for spatial multiplexing of maximum eight layers. The DMRS is transmitted for a specific user equipment only as will be aware of it from the user equipment specific reference signal which is another name of the DMRS. Accordingly, the DMRS may be transmitted from the RB only to which the PDSCH for the specific user equipment is transmitted.

Figure 7:
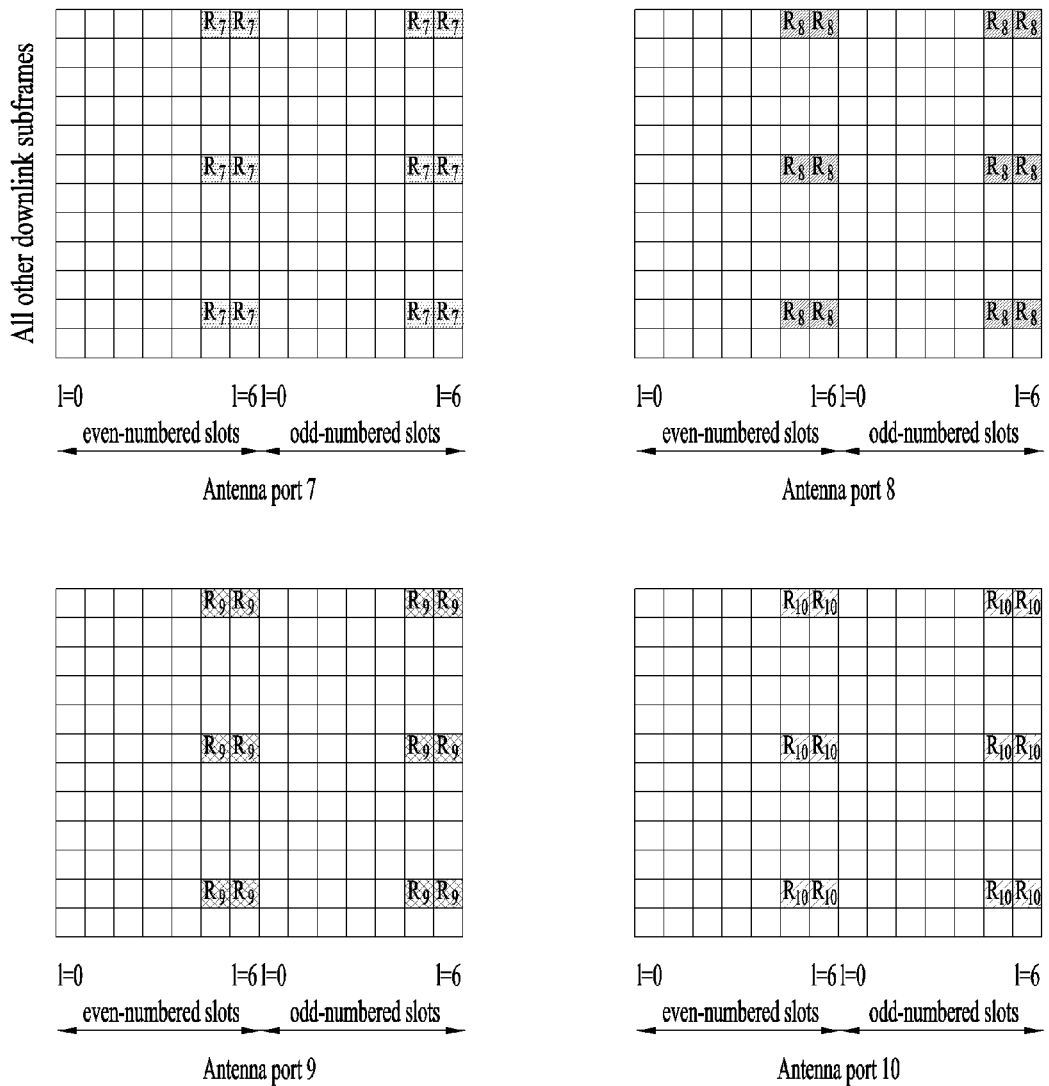
FIGS. 7 and 8 are diagrams illustrating a demodulation reference signal.

Generation of the DMRS for maximum eight layers will be described as follows. The DMRS may be transmitted in such a manner that a reference signal sequence r(m) generated in accordance with the following Equation 2 is mapped into a complex-valued modulation symbol $a_{k,l}^{(p)}$ in accordance with the following Equation 3. FIG. 7 illustrates that the DMRS is mapped into a resource grid on a subframe in accordance with the Equation 3 in case of normal CP, and relates to antenna ports 7 to 10.

$$r(m) = \frac{1}{\sqrt{2}}(1 - 2 \cdot c(2m)) + j\frac{1}{\sqrt{2}}(1 - 2 \cdot c(2m+1)), \quad [\text{Equation 2}]$$

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

In this case, r(m) means a reference sequence, c(i) means a pseudo-random sequence, and $N_{RB}^{max,DL}$ means the number of maximum RBs of a downlink bandwidth.

$$a_{k,l}^{(p)} = w_p(l') \cdot r(3 \cdot l' \cdot N_{RB}^{max,DL} + 3 \cdot n_{PRB} + m') \quad [\text{Equation 3}]$$

$$w_p(i) = \begin{cases} \overline{w}_p(i) & (m' + n_{PRB})\mod 2 = 0 \\ \overline{w}_p(3 - i) & (m' + n_{PRB})\mod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\mod 2 + 2 & incaseofspecialsubframeconfiguration\ 3, 4, 8, 9 \\ l'\mod 2 + 2 + 3\lfloor l'/2 \rfloor & incaseofspecialsubframeconfiguration\ 1, 2, 6, 7 \\ l'\mod 2 + 5 & incaseofnon\text{-}specialsubframe \end{cases}$$

$$l' = \begin{cases} 0, 1, 2, 3 & n_s\mod 2 = 0, \text{ and in case of special subframe configuration } 1, 2, 6, 7 \\ 0, 1 & n_s\mod 2 = 0, andincaseofnon\text{-}specialsubframeconfiguration\ 1, 2, 6, 7 \\ 2, 3 & n_s\mod 2 = 1, andincaseofnon\text{-}specialsubframeconfiguration1, 2, 6, 7 \end{cases}$$

$$m' = 0, 1, 2$$

As will be aware of it from the above Equation 3, an orthogonal sequence $\overline{w}_p(i)$ as illustrated in Table 3 below is used as the reference signal sequence in accordance with an antenna port when the reference signal sequence is mapped into a complex modulated symbol.

TABLE 3

| Antenna port $p$ | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DMRS may be used for channel estimation performed differently in accordance with a spreading factor 2 or 4. Referring to Table 1, since the orthogonal sequence is repeated in the form of [a b a b] at the antenna ports 7 to 10, the spreading factor is 2, and the spreading factor at the antenna ports 11 to 14 is 4. If the spreading factor is 2, the user equipment may perform channel estimation through time interpolation after performing inverse spreading for each of the DMRS of the first slot and the DMRS of the second slot by using the spreading factor 2. If the spreading factor is 4, the user equipment may perform channel estimation by performing inverse spreading for the DMRS at the entire subframe by using the spreading factor 4.

The aforementioned channel estimation based on the spreading factor may obtain gain according to application of time interpolation at high mobility and gain on decoding time due to inverse spreading for the DMRS of the first slot when the spreading factor 2 is used, and may support more user equipments or ranks when the spreading factor 4 is used.

Figure 8:
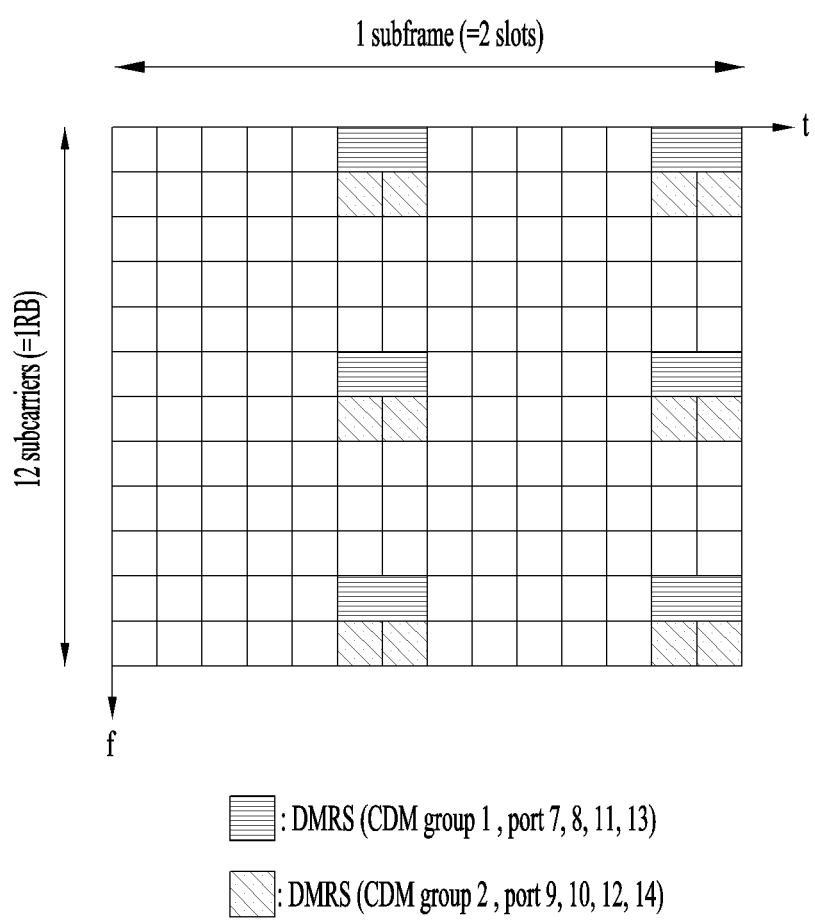

DMRS overhead will be described with reference to FIG. 8. FIG. 8 illustrates mapping of the DMRS for each of antenna ports 7 to 14 onto the subframe. As shown in FIG. 5, the DMRS may be divided into a code divisional multiplexing (CDM) group 1 (or first antenna port set) and a CDM group 2 (or second antenna port set) in accordance with a mapping position of the DMRS into a resource grid. The DMRS is transmitted from the RE corresponding to the CDM group 1 through the antenna ports 7, 8, 11 and 13, and the DMRS is transmitted from the RE corresponding to the CDM group 2 through the antenna ports 9, 10, 12 and 14. In other words, the same RE to which the DMRS is transmitted is applied to the antenna ports included in one CDM group. If the DMRS is transmitted using the antenna ports only corresponding to the CDM group 1, 12 resources will be required for the DMRS, that is, DMRS overhead becomes 12. Likewise, if the antenna ports corresponding to the CDM group 2 are used, DMRS overhead becomes 24.

In the LTE system after the release 11, an enhanced-PDCCH (EPDCCH) is considered as a solution of a lack of PDCCH capacity caused by Coordinate Multi Point (CoMP), Multi-User-Multiple Input Multiple Output (MU-MIMO), etc. and PDCCH throughput deterioration caused by inter-cell interference. The EPDCCH may be transmitted to a PDSCH resource region unlike the existing PDCCH. Also, the EPDCCH may be used for channel estimation based on the DMRS, unlike the PDCCH based on the CRS, to obtain precoding gain.

Figure 9:
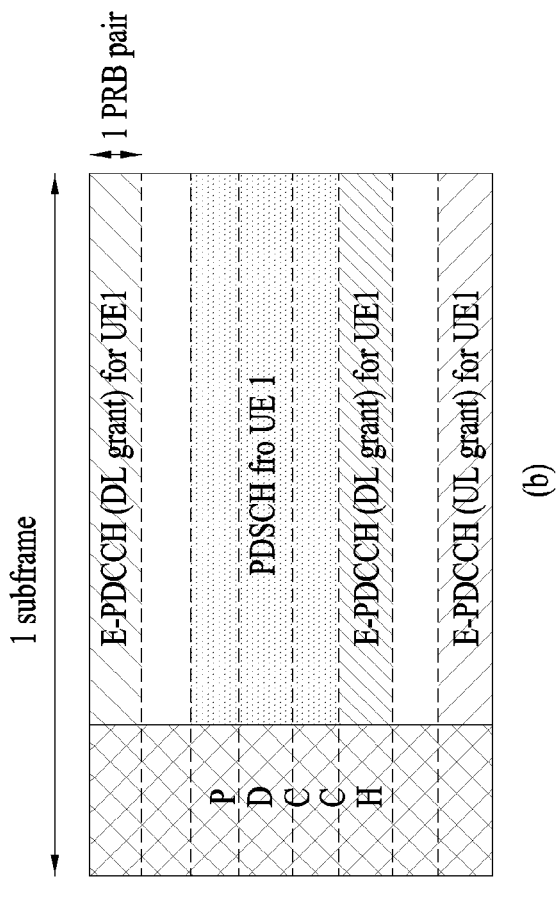
FIGS. 9 to 12 are diagrams illustrating embodiments of the present invention.

FIG. 9 illustrates that the EPDCCH is transmitted on a plurality of PRB pairs. FIG. 9(a) illustrates that the EPDCCH for a user equipment 1 (UE1) is divided into downlink allocation (DL grant) DCI and uplink grant (UL grant) DCI and then transmitted to different PRB pairs, and FIG. 9(b) illustrates that the EPDCCH for a user equipment 1 (UE1) is divided into a plurality of kinds of downlink allocation (DL grant) DCI and uplink grant (UL grant) DCI and then transmitted to different PRB pairs. Although FIG. 9 illustrates that one PRB pair transmits one DCI, FIG. 9 is exemplary. In more detail, one PRB pair may include four ECCEs, each of which includes four EREGs. A localized EPDCCH may be transmitted in a unit of ECCE, and in case of a distributed EPDCCH, one ECCE may be configured by EREGs belonging to their respective PRB pairs different from each other, whereby EPDCCH transmission may be performed. A plurality of ECCEs may be used for one EPDCCH (or DCI) transmission in accordance with the aggregation level. Accordingly, in case of the aggregation level 1, one DCI may be transmitted using one ECCE. In this case, unlike FIG. 9, two or more of DCI may be transmitted to one PRB pair.

Subsequently, in case of FIG. 9(b), one EPDCCH may naturally be transmitted to a plurality of PRB pairs during the step of combining the EPDCCH with another EPDCCH for another user equipment in accordance with an interleaving mode. One EPDCCH may be transmitted to the plurality of PRB pairs in accordance with a non-interleaving mode. In other words, in case of the aggregation level 4, 8 or more, or in case of the distributed EPDCCH, as shown in FIG. 9(b), one DCI (for example, downlink allocation DCI) may be transmitted through two or more PRB pairs. In FIG. 9, uplink grant DCI may not be transmitted as the case may be. In this case, it may seem that FIG. 9 illustrates a case (FIG. 9(a)) where downlink allocation DCI is transmitted on a single PRB pair and a case (FIG. 9(b)) where downlink allocation DCI is transmitted on a plurality of PRB pairs.

As described above, the EPDCCH may be transmitted based on the DMRS. If the EPDCCH for a random user equipment is transmitted to a plurality of PRB pairs as shown in FIG. 9, respective DMRS configurations (hereinafter, DMRS configuration is used to mean that it includes information related to DMRS port, SCID and/or DMRS scrambling sequence) different from one another may be provided for each PRB pair (in accordance with frequency selectivity of each PRB pair).

In the meantime, in the existing LTE/LTE-A system, a downlink fallback mode is defined to dynamically consider a channel status. The fallback mode is provide to additionally perform blind decoding for the DCI format 1A together with the DCI formats 1, 1B, 1D, 2, 2A, 2B and 2C based on the transmission mode to process the status that the channel is rapidly deteriorated. The DCI format 1A means operation of either 1 port transmission or transmit diversity. Since the DCI format 1A represents rank 1 transmission, an information field indicating transmission rank or port, SCID, etc. does not exist. Accordingly, as described above, if the EPDCCH for the same UE is transmitted to the plurality of PRB pairs and DMRS configuration is varied depending on each PRB pair, a problem occurs in that the user equipment cannot know information such as antenna port, SCID, etc, which are required for demodulation of PDSCH transmitted based on the DMRS to apply the DCI format 1A.

Accordingly, the present invention suggests a method for application of a DCI format 1A if EPDCCH is transmitted to a plurality of PRB pairs and DMRS configuration is varied for each of the PRB pairs.

Embodiment 1

The first embodiment suggests that DMRS information/configuration (for example, antenna port, SCID, DMRS overhead, etc.) required for decoding of the PDSCH on a resource region indicated through downlink allocation of fallback mode DCI should be transferred through RRC signaling.

Figure 10:
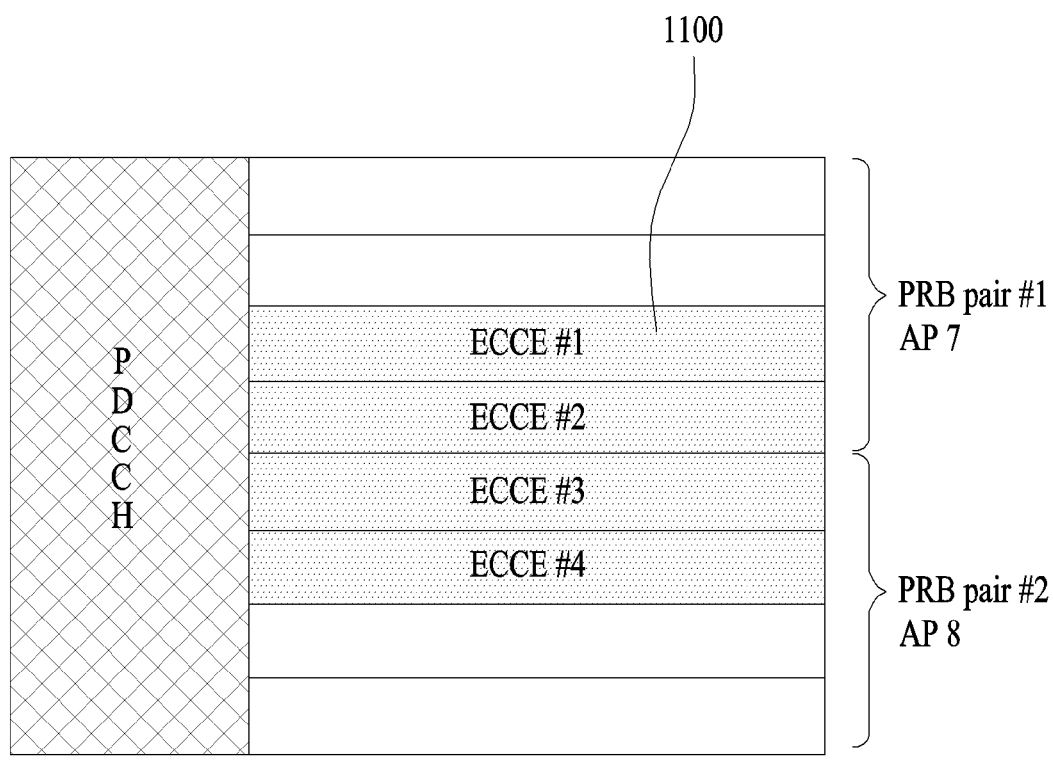

Alternatively, DMRS information/configuration set, which may be used by a specific user equipment, may be signaled (RRC signaling, but not limited to RRC signaling), and DMRS information/configuration having the lowest index in the corresponding DMRS information/configuration set may be used in a fallback mode. In other words, the DMRS information/configuration the same as that of the EPDCCH may be used, and if a plurality of DMRS information/configurations are used for one EPDCCH, DMRS information/configuration of the ECCE, which has the lowest index, among the ECCEs constituting the corresponding candidate, may be used. This will be described with reference to FIG. 10. FIG. 10 illustrates that one DCI (EPDCCH, 1100) of the aggregation level 4 is transmitted through two PRB pairs (PRB pair #1, 2). It is assumed that DMRS antenna ports 9 and 7 are set to two PRB pairs, PRB pair #1 and PRB pair #2, as main antenna ports. Also, it is assumed that the aforementioned DMRS information/configuration set which is signaled is as illustrated in Table 4 below.

TABLE 4

| DMRS information/configuration | 1 | 2 | 3 |
|---|---|---|---|
| Antenna port | 8 | 9 | 10 |

In this case, the user equipment may select any one of the signaled DMRS information/configuration set and use the selected one for PDSCH decoding, wherein the DMRS information/configuration having the lowest index of the ECCE may be selected. In this case, although the antenna port corresponding to the ECCE having the lowest index is 7, since there is no value corresponding to the antenna port 7 in the DMRS information/configuration set signaled to the user equipment, DMRS information/configuration corresponding to next antenna port 9 may be used.

Embodiment 2

The second embodiment suggests that PDSCH decoding based on fallback DCI should follow DMRS information/configuration of downlink allocation if one E-PDCCH is divided into downlink allocation and uplink grant and then transmitted to different PRB pairs.

Figure 11:
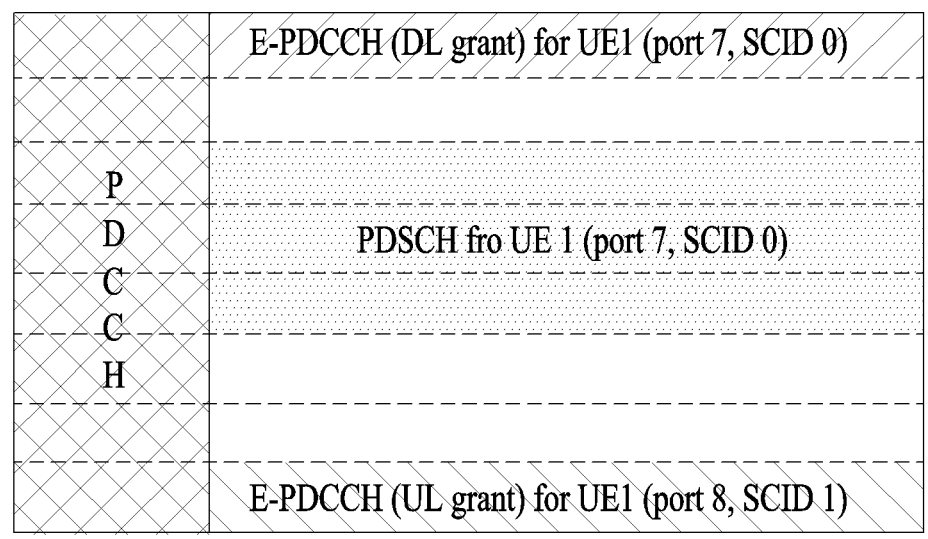

For example, if the E-PDCCH is transmitted as shown in FIG. 11 (DCI format 1A), that is, as a case where downlink allocation DCI and uplink grant DCI are transmitted to their respective PRB pairs different from each other and DMRS information/configuration of the E-PDCCH to which the downlink allocation DCI is transmitted corresponds to antenna port 7 and SCID 0, if EPDCCH decoding is used such DMRS information/configuration, the PDSCH may be decoded using the DMRS information/configuration of the E-PDCCH to which the downlink allocation DCI is transmitted.

In this case, the DMRS information/configuration of the antenna port 7 corresponds to the PRB pair corresponding to the downlink allocation DCI. This antenna port may be selected as a main antenna port of a plurality of antenna ports allocated to the corresponding PRB pair.

Embodiment 3

The third embodiment relates to a case where downlink allocation DCI is transmitted on a plurality of PRB pairs. This case may correspond to an aggregation level of high level (for example, 4, 8, 16, etc.) or distributed EPDCCH transmission, as described above.

In this case, the user equipment may determine DMRS information/configuration, which will be used for decoding of the PDSCH in a fallback mode, as DMRS information/configuration of PRB pair having the lowest antenna port index among PRB pairs to which downlink allocation DCI is transmitted.

In more detail, if both uplink grant DCI and downlink allocation DCI are transmitted for the corresponding subframe, the user equipment may use DMRS information/configuration of PRB pair to which downlink allocation DCI is transmitted, among DMRS information/configurations of the PRB pairs to which the uplink grant DCI and the downlink allocation DCI are respectively transmitted, for PDSCH decoding. Moreover, if the downlink allocation DCI is transmitted on the plurality of PRB pairs, DMRS information/configuration having the lowest antenna port index, among the DMRS information/configurations of the plurality of PRB pairs for the downlink allocation DCI, may be used for PDSCH decoding.

Figure 12:
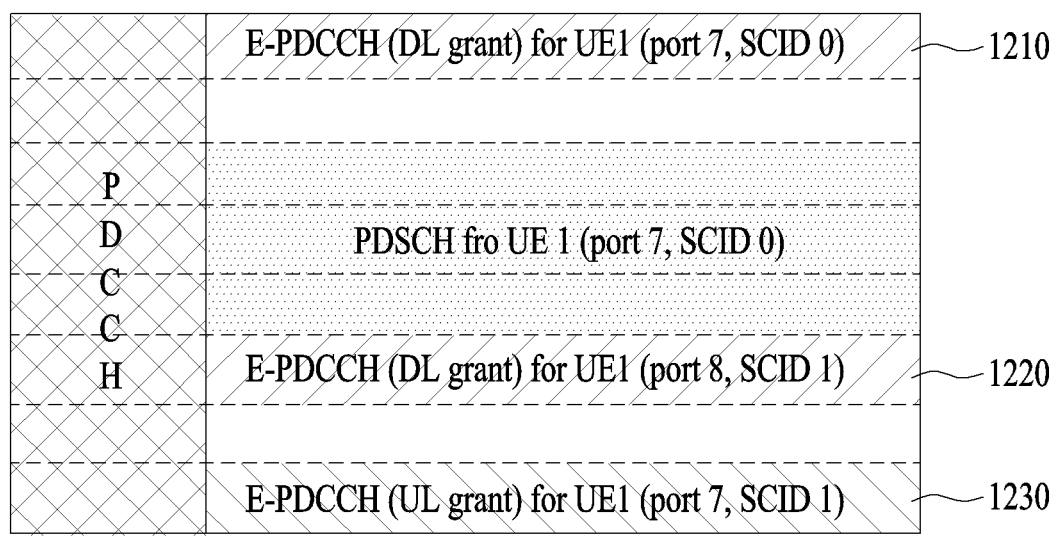

FIG. 12 is a diagram illustrating an example of the Embodiment 3. Referring to FIG. 12, the downlink allocation DCI is transmitted through two PRB pairs 1210 and 1220, wherein DMRS configuration of the first PRB pair 1210 includes an antenna port 7 and SCID 0, and DMRS configuration of the second PRB pair 1220 includes an antenna port 8 and SCID 1. Also, the uplink grant DCI is transmitted through another PRB pair 1230, wherein DMRS configuration of the corresponding PRB pair 1230 includes an antenna port 7 and SCID 1. In the aforementioned description, the antenna port corresponding to DMRS configuration of each PRB pair may be selected as a main antenna port of the plurality of antenna ports allocated to the corresponding PRB pair.

In the status of FIG. 12, DMRS information/configuration, which should be used for PDSCH decoding of the user equipment in the fallback mode, may be DMRS information/configuration for EPDCCH decoding of the PRB pair having the lowest antenna port index 7, that is, the first PRB pair of two PRB pairs 1210 and 1220 to which the downlink allocation DCI is transmitted.

The aforementioned embodiments may be implemented independently or in combination, whereby ambiguity of DMRS information/configuration, which should be used for PDSCH decoding in the fallback mode of the EPDCCH, may be solved.

Figure 13:
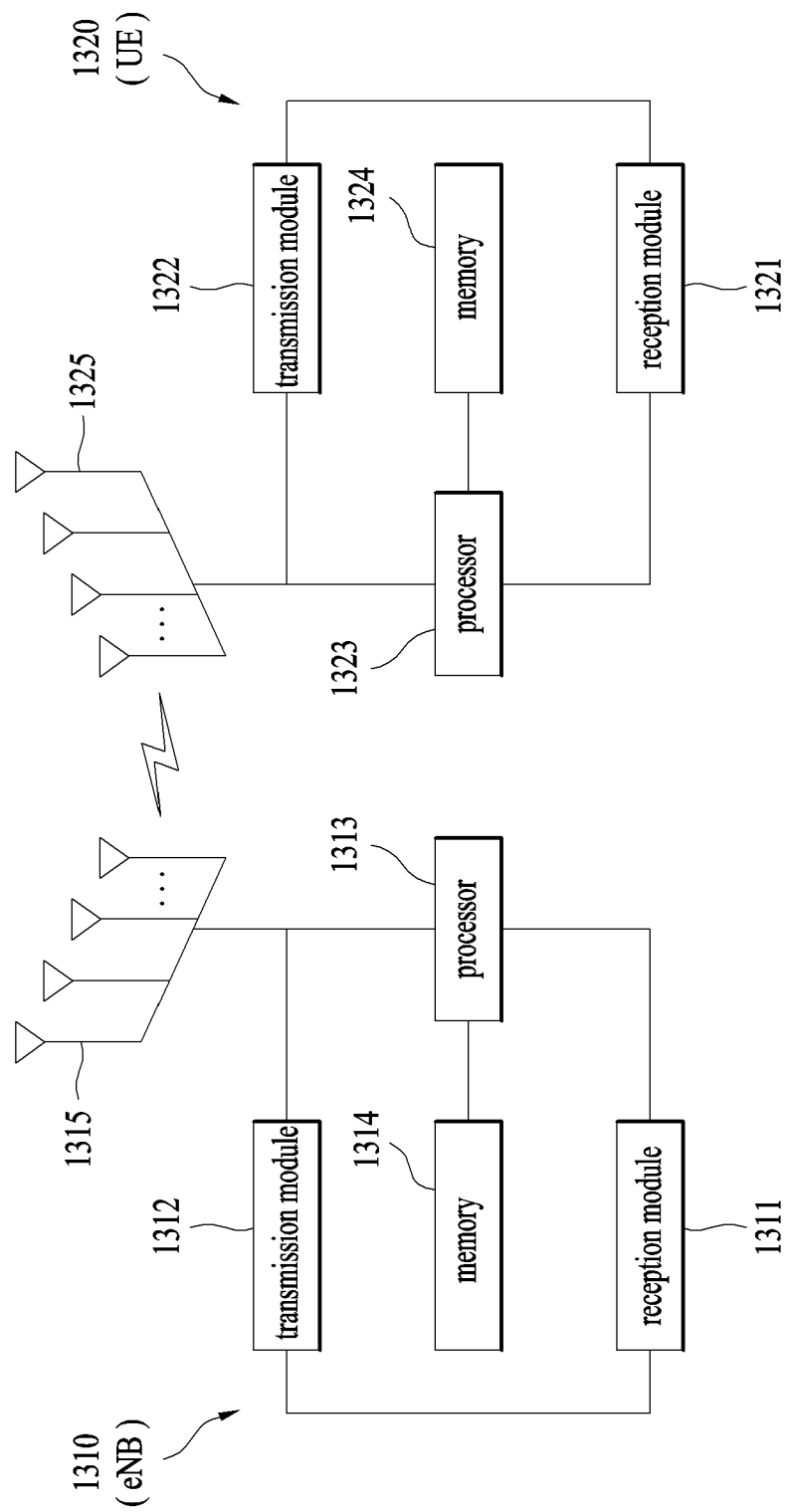
FIG. 13 is a diagram illustrating configuration of a transceiving device.

FIG. 13 is a diagram illustrating configuration of a transmission point device and a user equipment according to the embodiment of the present invention.

Referring to FIG. 13, a transmission point device 1310 according to the present invention may include a reception module 1311, a transmission module 1312, a processor 1313, a memory 1314, and a plurality of antennas 1315. The plurality of antennas 1315 mean the transmission point device that supports MIMO transmission and reception. The reception module 1311 may receive various kinds of signals, data and information on an uplink from the user equipment. The transmission module 1312 may transmit various kinds of signal, data and information on a downlink to the user equipment. The processor 1313 may control the overall operation of the base station 1310.

The processor 1313 of the transmission point device 1310 according to one embodiment of the present invention may transmit DCI to conform to the aforementioned embodiments.

The processor 1313 of the transmission point device 1310 performs a function of processing operation for information received by the transmission point device 1310, information to be transmitted to the outside, etc., and the memory 1314 may store the operation processed information for a predetermined time and may be replaced with an element such as a buffer (not shown).

Subsequently, referring to FIG. 13, the user equipment 1320 according to the present invention may include reception module 1321, a transmission module 1322, a processor 1323, a memory 1324, and a plurality of antennas 1325. The plurality of antennas 1325 mean the user equipment that supports MIMO transmission and reception. The reception module 1321 may receive various kinds of signals, data and information on a downlink from the base station. The transmission module 1322 may transmit various kinds of signal, data and information on an uplink to the base station. The processor 1323 may control the overall operation of the user equipment 1320.

The processor 1323 of the user equipment 1320 according to one embodiment of the present invention may perform decoding of EPDCCH and PDSCH in accordance with the aforementioned embodiments.

In addition, the processor 1323 of the user equipment 1320 performs a function of processing operation for information received by the user equipment 1320, information to be transmitted to the outside, etc., and the memory 1324 may store the operation processed information for a predetermined time and may be replaced with an element such as a buffer (not shown).

The details of the aforementioned transmission point device and the aforementioned user equipment may be configured in such a manner that the aforementioned various embodiments of the present invention may independently be applied to the aforementioned transmission point device and the aforementioned user equipment, or two or more embodiments may simultaneously be applied to the aforementioned transmission point device and the aforementioned user equipment, and repeated description will be omitted for clarification.

Also, in the description of FIG. 13, the description of the transmission point device 1310 may equally be applied to a relay station as a downlink transmission entity or an uplink reception entity, and the description of the user equipment 1320 may equally be applied to a downlink reception entity or an uplink transmission entity.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various mobile communication systems.

The invention claimed is:

1. A method for allowing a user equipment to receive data in a wireless communication system, the method comprising:
performing, by the user equipment, blind decoding for an enhanced physical downlink channel (EPDCCH) in which a downlink control information (DCI) is transmitted; and
decoding, by the user equipment, data of a physical downlink shared channel (PDSCH) by using DCI,
wherein, if the DCI does not comprise demodulation reference signal information for decoding of the P the PDSCH is decoded by using demodulation reference signal information associated with a resource block among a plurality of resource blocks in which the DCI is transmitted.

2. The method according to claim 1, wherein, if a downlink grant of the DCI is transmitted on two or more of the plurality of resource blocks, the demodulation reference signal information for decoding of the PDSCH is associated with a resource block having a lowest antenna port index among the two or more resource blocks.

3. The method according to claim 1, wherein, if a downlink grant of the DCI is transmitted in one resource block, the demodulation reference signal information for decoding of the PDSCH is one antenna port selected from a plurality of antenna ports allocated to the one resource block.

4. The method according to claim 1, wherein the demodulation reference signal information includes at least one of information related to an antenna port and information related to a scrambling sequence.

5. The method according to claim 4, wherein the antenna port is one selected from a plurality of antenna ports allocated to each of one or more resource blocks for the EPDCCH.

6. The method according to claim 1, wherein if the DCI does not comprise demodulation reference signal information for decoding of the PDSCH, a DCI format of the DCI is a DCI format 1A.

7. A user equipment in a wireless communication system, the user equipment comprising:
a reception module configured to receive an enhanced physical downlink channel (EPDCCH); and
a processor,
wherein the processor is configured to:
perform blind decoding for the received EPDCCH in which a downlink control information (DCI) is transmitted, and
decode data of a physical downlink shared channel (PDSCH) by using DCI,
wherein, if the DCI does not comprise demodulation reference signal information for decoding of the PDSCH, the PDSCH is decoded by using demodulation reference signal information associated with a resource block among a plurality of resource blocks in which the DCI is transmitted.

8. The user equipment according to claim 7, wherein, if a downlink grant of the DCI is transmitted on two or more of the plurality of resource blocks, the demodulation reference signal information for decoding of the PDSCH is associated with a resource block having a lowest antenna port index among the two or more resource blocks.

9. The user equipment according to claim 7, wherein, if a downlink grant of the DCI is transmitted in one resource block, the demodulation reference signal information for decoding of the PDSCH is one antenna port selected from a plurality of antenna ports allocated to the one resource block.

10. The user equipment according to claim 7, wherein the demodulation reference signal information includes at least one of information related to an antenna port and information related to a scrambling sequence.

11. The user equipment according to claim 10, wherein the antenna port is one selected from a plurality of antenna ports allocated to each of one or more resource blocks for the EPDCCH.

12. The user equipment according to claim 7, wherein if the DCI does not comprise demodulation reference signal information for decoding of the PDSCH, a DCI format of the DCI is a DCI format 1A.

* * * * *